(No Model.)
J. ROBY.
CHECKING AND UNCHECKING DEVICE.
No. 415,284. Patented Nov. 19, 1889.
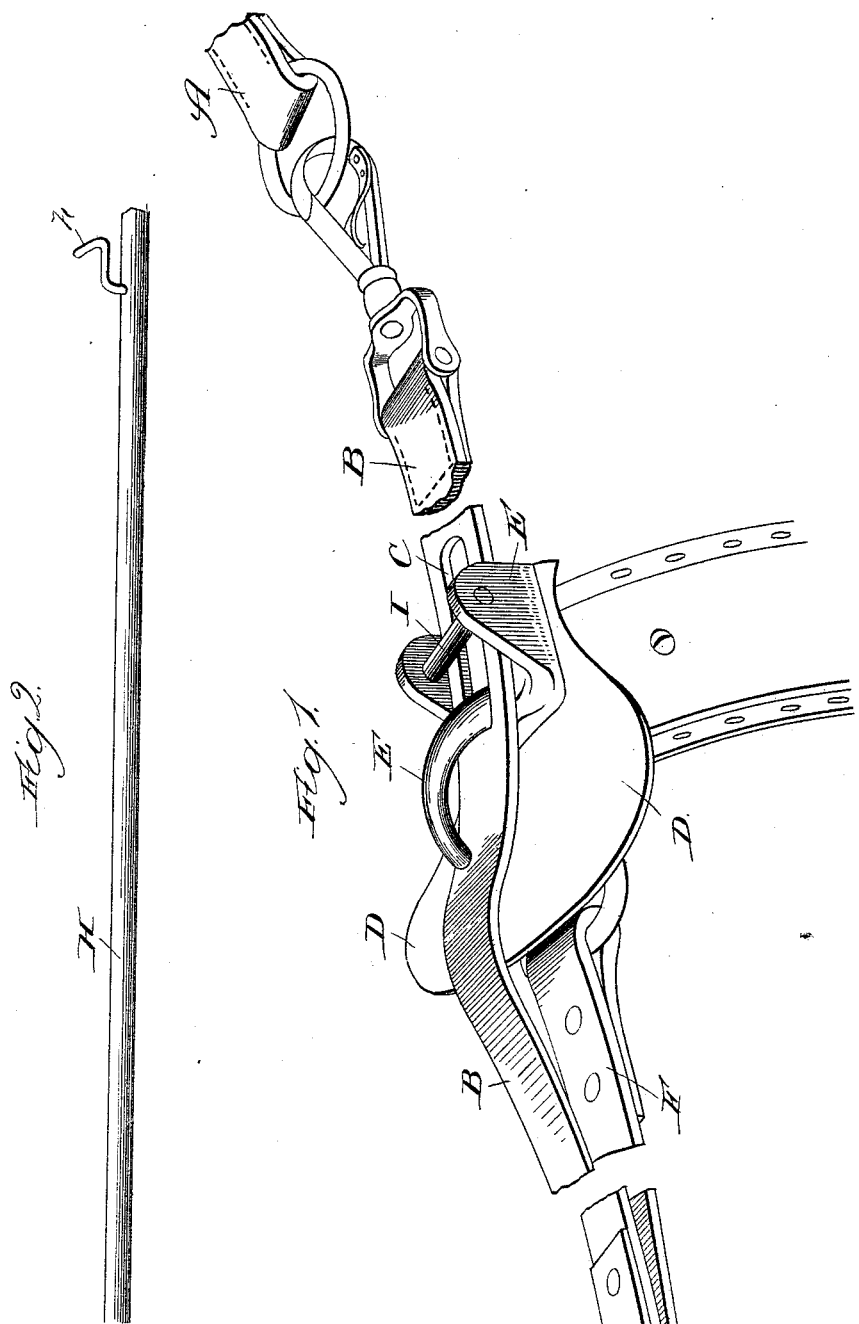
Witnesses:
Chas. E. Gaylord,
Clifford A. White.
Inventor:
James Roby
By Banning & Banning & Payson,
Att'ys

UNITED STATES PATENT OFFICE.

JAMES ROBY, OF CHICAGO, ILLINOIS.

CHECKING AND UNCHECKING DEVICE.

SPECIFICATION forming part of Letters Patent No. 415,284, dated November 19, 1889.

Application filed April 26, 1889. Serial No. 308,749. (No model.)

*To all whom it may concern:*

Be it known that I, JAMES ROBY, a citizen of the United States, residing at Chicago, Cook county, Illinois, have invented a new and useful Improvement in Check-Rein Attachments, of which the following is a specification.

The object of my invention is to provide means whereby the driver can check or uncheck the horse without leaving the vehicle, and whereby all pull upon the horse's mouth is avoided in driving, except what ordinarily comes from the check-rein alone; and my invention consists in the features and details of construction hereinafter described and claimed.

In the drawings, Figure 1 is a perspective view of my device, and Fig. 2 a plan view of the whip-stock and hook by means of which the device is operated.

A is the check-rein; B, a strap attached to such rein; C, a slot in such strap; D, a saddle; E, a hook and guide attached to such saddle; F, the back-strap leading from the saddle to the crupper, (not shown;) $f$, a stud or pin fastened to such strap; G, a ring at the end of the strap B; H, the whip-stock, and $h$ a hook fastened thereto.

In constructing my improvement the check-rein, saddle, and back-strap are made in the ordinary manner, and, inasmuch as they are well known, require no further description. I next make a strap B, preferably of leather, though it may be made of rubber or other suitable material; or, if desired, a chain may be used in place of such strap. This strap I attach, preferably by a snap-hook or other separable connection, to the ring at the end of the check-rein. It is preferably about two feet in length, and is provided with a ring G at the end farthest from the check-rein, which passes over and is held by the stud or hook $f$, fastened to the back-strap. I next construct, preferably of metal, a guide and hook, preferably of the form shown in the drawings, and attach it to the saddle. This guide, when made as shown in the drawings, consists, preferably, of a flat piece of metal having an ear at either side, between which the strap B passes, and is furthermore preferably provided with a metal bar I, to prevent too great a raising of the strap. At the rear end of this guide I form, preferably integral with the guide, a hook E, extending and curving backward for the purpose of engaging and retaining the strap B. The strap B passes under the bar I of this guide, and is provided with a longitudinal slot C, adapted to pass over and be engaged by the hook E.

For the purpose of operating my device, I prefer to attach to the whip-stock, some three feet from the end thereof, a hook similar to that shown in Fig. 2 of the drawings, and which may be fastened to the whip by means of a ferrule, or in other suitable manner.

My device operates as follows: When in the position shown in Fig. 1, the horse is supposed to be checked. If now it be desired to uncheck him for the purpose of watering, or for any other purpose, the ring G is caught by the hook $h$, and the strap B pulled toward the vehicle and slightly raised. When this is done, the hook E will pass through the slot in the strap B, which strap will then be released from the hook and may be allowed to pass forward through the guide a sufficient distance to allow the horse to drink, &c. To recheck the animal it will merely be necessary to pull the strap B backward and lower it to allow the hook to enter and become engaged by the slot. The ring G is then passed over the stud or pin $f$, and the strap held closely to the back-strap, thereby presenting a neat appearance.

It will be seen that by the use of this device the horse can be readily checked and unchecked, as desired, and that there is at no time any further pull upon his mouth than is caused by the check-rein, the strap D being fastened to the back-strap F in such manner as not to pull upon the animal.

I am aware that there have been previous devices where the horse could be unchecked by means of a line attached directly to the reins, as shown in the patent to C. L. Bard, No. 327,057, September 29, 1885; but I do not desire to claim any such construction, inasmuch as in my device the checking and unchecking are accomplished by means of a strap wholly independent of and unconnected with the reins, thereby avoiding the liability of unchecking or checking the horse by a careless or inadvertent pull upon the reins.

I claim—

The combination of a saddle provided with lugs, a transverse bar, and a rearwardly-curved hook, with an unchecking-strap, slotted as described, provided with a snap-hook or analogous device at its front end for engagement with the check-rein, and at its rear end with a ring adapted to engage a hook or projection on the back-strap, substantially as described.

JAMES ROBY.

Witnesses:
GEORGE S. PAYSON,
SAMUEL E. HIBBEN.